US012090863B2

(12) United States Patent
Neic et al.

(10) Patent No.: US 12,090,863 B2
(45) Date of Patent: Sep. 17, 2024

(54) DISCHARGE APPARATUS FOR AN ELECTRICAL DRIVE ARRANGEMENT OF A VEHICLE AND ELECTRICAL DRIVE ARRANGEMENT COMPRISING THE DISCHARGE APPARATUS

(71) Applicant: Magna Powertrain GmbH & Co KG, Lannach (AT)

(72) Inventors: Aurel-Vasile Neic, Kasten bei Böheimkirchen (AT); Christian Spindelberger, Gablitz (AT); Marcus Woegerer, Kaltenleutgeben (AT); Gyula Huszar, Vienna (AT)

(73) Assignee: Magna Powertrain GmbH & Co KG, Lannach (AT)

( * ) Notice: Subject to any disclaimer, the term of this patent is extended or adjusted under 35 U.S.C. 154(b) by 299 days.

(21) Appl. No.: 17/760,515

(22) PCT Filed: Oct. 15, 2020

(86) PCT No.: PCT/EP2020/079107
§ 371 (c)(1),
(2) Date: Mar. 15, 2022

(87) PCT Pub. No.: WO2021/083687
PCT Pub. Date: May 6, 2021

(65) Prior Publication Data
US 2022/0348084 A1 Nov. 3, 2022

(30) Foreign Application Priority Data
Oct. 28, 2019 (DE) ...................... 10 2019 216 568.0

(51) Int. Cl.
H02M 1/32 (2007.01)
B60L 3/00 (2019.01)
(Continued)

(52) U.S. Cl.
CPC .............. B60L 3/0023 (2013.01); B60L 3/04 (2013.01); H02J 7/0068 (2013.01); H02M 1/322 (2021.05); H02J 2310/48 (2020.01)

(58) Field of Classification Search
None
See application file for complete search history.

(56) References Cited

U.S. PATENT DOCUMENTS

| 4,661,910 A | 4/1987 | Reinecke et al. |
| 2005/0264256 A1 | 12/2005 | Choi et al. |

(Continued)

FOREIGN PATENT DOCUMENTS

| CN | 105636820 A | 6/2016 |
| DE | 3435055 A1 | 4/1986 |

(Continued)

OTHER PUBLICATIONS

Written Opinion of International Searching Authority and International Search Report for International Application No. PCT/EP2020/079107, mailed Feb. 4, 2021, 14 page(s), English Translation of International Search Report Included.

(Continued)

Primary Examiner — Daniel L Greene
(74) Attorney, Agent, or Firm — Dickinson Wright PLLC

(57) ABSTRACT

A discharge apparatus for an electrical drive arrangement of a vehicle, having an input interface, having an output interface, having a main switching device, wherein the main switching device is connected to the input interface, having a first discharge branch, wherein a first input of the first discharge branch is connected to the main switching device, having a second discharge branch, and having a control device, wherein the control device is designed to connect the (Continued)

first discharge branch in a first discharge state of the discharge apparatus and to connect the second discharge branch in a second discharge state.

11 Claims, 1 Drawing Sheet

(51) Int. Cl.
    *B60L 3/04*     (2006.01)
    *H02J 7/00*     (2006.01)

(56) References Cited

U.S. PATENT DOCUMENTS

| | | | |
|---|---|---|---|
| 2006/0202636 A1* | 9/2006 | Schneider | H02J 9/062 |
| | | | 315/291 |
| 2009/0268354 A1* | 10/2009 | Kaplan | B60L 3/0023 |
| | | | 320/167 |
| 2010/0214055 A1 | 8/2010 | Fuji et al. | |
| 2011/0093148 A1 | 4/2011 | Kuehner et al. | |
| 2011/0234176 A1 | 9/2011 | Nakamura et al. | |
| 2013/0234510 A1 | 9/2013 | Nakamura | |
| 2013/0285581 A1 | 10/2013 | Meyer, III et al. | |
| 2017/0256971 A1* | 9/2017 | Namou | H02J 7/00306 |
| 2017/0256972 A1 | 9/2017 | Namou et al. | |

FOREIGN PATENT DOCUMENTS

| | | |
|---|---|---|
| DE | 102008010980 A1 | 8/2009 |
| DE | 102012216004 A1 | 3/2014 |
| DE | 102016123209 A1 | 6/2018 |
| JP | 2010057290 A | 3/2010 |
| JP | 2015226347 A | 12/2015 |

OTHER PUBLICATIONS

Chinese Office Action from CN202080074910.8 dated Mar. 21, 2024.

* cited by examiner

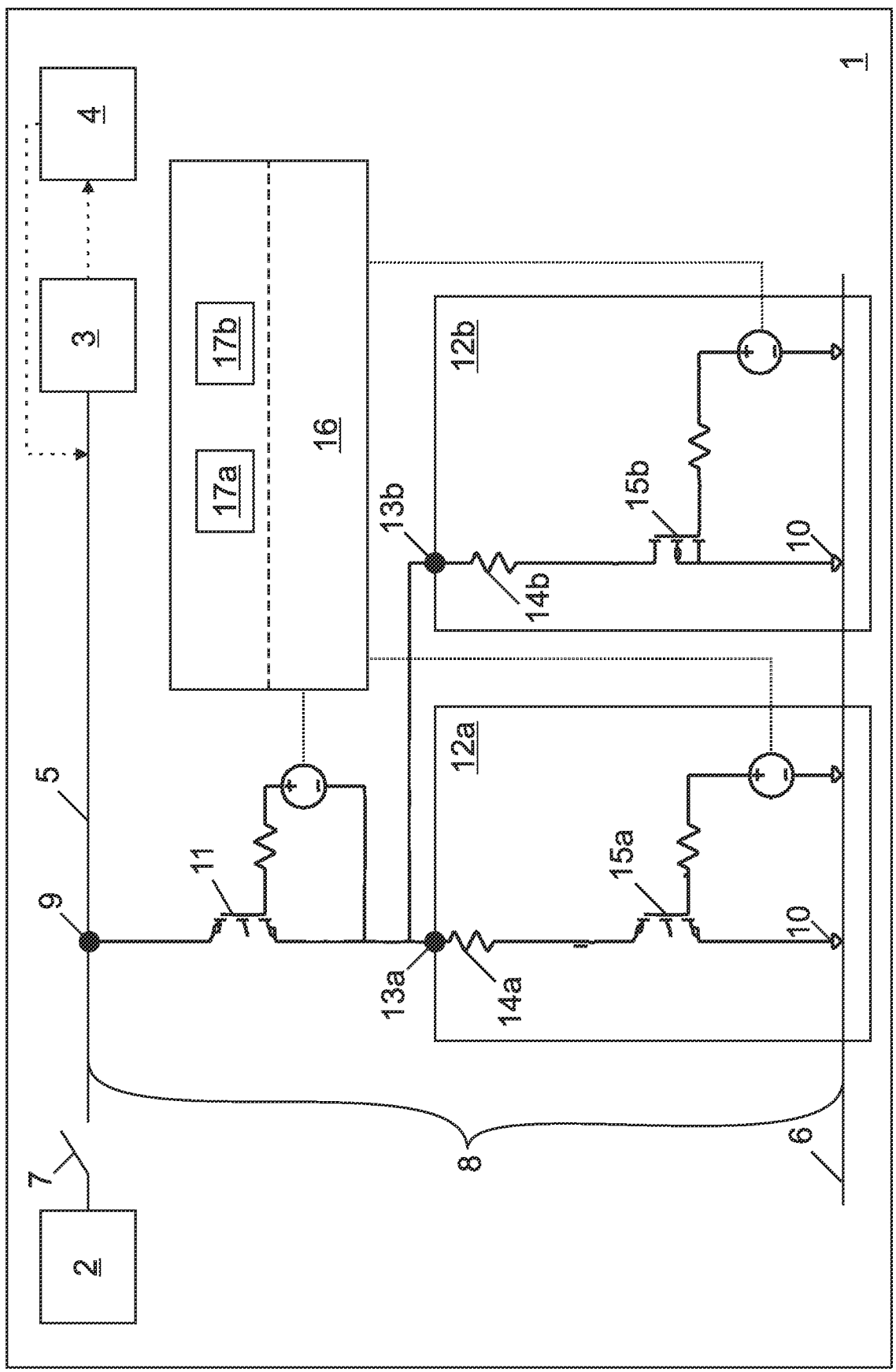

DISCHARGE APPARATUS FOR AN ELECTRICAL DRIVE ARRANGEMENT OF A VEHICLE AND ELECTRICAL DRIVE ARRANGEMENT COMPRISING THE DISCHARGE APPARATUS

CROSS-REFERENCE TO RELATED APPLICATIONS

This application is a National Stage of International Application No. PCT/EP2020/079107, filed Oct. 15, 2020, which claims priority to DE 102019216568.0 filed Oct. 28, 2019. The entire disclosures of each of the above applications are incorporated herein by reference.

FIELD OF THE INVENTION

The invention relates to a discharge apparatus for an electrical drive arrangement of a vehicle having the features of the preamble of Claim 1. The invention also relates to an electrical drive arrangement of a vehicle having the discharge apparatus having the features of Claim 11.

BACKGROUND OF THE INVENTION

This section provides information related to the present disclosure which is not necessarily prior art.

In the case of electrical drives for vehicles, the main steady-state operating states, for example drive, recuperation etc., are in the foreground. However, in addition to these main operating states, the change of operating states as well as secondary operating states and/or emergency operating states must also be taken into account. It is thus well known that it may be useful/necessary, when switching off the voltage supply, to reduce the voltage present in the intermediate circuit of the inverter promptly in order to enable repair measures, for example. It is also known that, when charging a battery for the drive arrangement, for example using recuperation, the sudden decoupling of the battery may result in a voltage increase or overvoltage which can damage components in the electrical drive.

For example, the document DE 34 35 055 A1 discloses a device for protecting anti-lock electronics against overvoltages in the vehicle electrical system of a motor vehicle. The device is intended to protect against a so-called "load dump", in particular. The document US 2013/285581 A1 describes a circuit arrangement for an electrical drive, wherein a branch is provided for switchable discharge. An IGBT is arranged in the branch as a switching element.

SUMMARY OF THE INVENTION

This section provides a general summary of the disclosure, and is not a comprehensive disclosure of its full scope or all of its features.

The invention is based on the object of providing a discharge apparatus for an electrical drive arrangement, which apparatus is functionally reliable and, at the same time, can be constructed in a cost-effective manner.

This object is achieved by means of a discharge apparatus having the features of Claim 1 and by means of a drive arrangement having the features of Claim 11. Preferred or advantageous embodiments of the invention emerge from the subclaims, the following description and the accompanying figures.

The invention proposes a discharge apparatus which is suitable and/or designed for an electrical drive arrangement of a vehicle. The drive arrangement is used to drive the vehicle. It preferably comprises at least one electric motor as a traction motor for the drive and an energy storage device for providing and/or buffering electrical energy for supplying the electric motor.

The drive arrangement also has a high-voltage bus and a basic bus. The high-voltage bus may also be referred to as a positive supply voltage line and/or positive supply rail ("positive rail"), and the basic bus may also be referred to as a negative supply voltage line and/or negative supply rail ("negative rail"). The high-voltage bus is connectable and/or connected to the energy storage device and to the electrical machine, in particular on the basis of the operating state. In a steady-state operating state, voltages of greater than 200 V, preferably greater than 400 V, in particular greater than 600 V, and especially greater than 750 V, can be applied to the high-voltage bus. The voltage preferably corresponds to the voltage of the energy storage device. The basic bus is preferably in the form of earth and/or is connected to the earth of the vehicle in terms of circuitry.

The discharge apparatus has an input interface, wherein the input interface is connectable to the high-voltage bus of the drive arrangement in terms of circuitry and is connected in terms of circuitry during operation of the discharge apparatus. The input interface may be in the form of a disconnectable interface, but is preferably only in the form of a virtual input interface which is not disconnectable.

The discharge apparatus has an output interface, wherein the output interface is connectable to the basic bus of the drive arrangement in terms of circuitry and is connected in terms of circuitry during operation of the discharge apparatus. The output interface may be in the form of a disconnectable interface, but is preferably only in the form of a virtual output interface which is not disconnectable. Provision may be made for the discharge apparatus to have a plurality of output interfaces which are electrically connected to one another and/or in contact with one another, however, and are referred to together as an output interface.

The discharge apparatus has a main switching device, wherein the main switching device is electrically connected to the input interface. The main switching device preferably makes direct electrical contact with the input interface and/or the high-voltage bus. In particular, no resistor and/or no impedance is/are interposed between the input interface and the main switching device.

The discharge apparatus has a first discharge branch, wherein a first input of the first discharge branch is connected to the main switching device. The main switching device can therefore electrically connect the first input of the first discharge branch to the high-voltage bus and can disconnect it. A first output of the first discharge branch is connected to the output interface or is formed by the latter.

A first discharge switching device and a first discharge resistor are arranged in series with one another in the first discharge branch. The first discharge resistor is preferably arranged in series between the main switching device and the first discharge switching device.

The discharge apparatus has a second discharge branch, wherein a second input of the second discharge branch is connected to the main switching device. The main switching device can therefore electrically connect the second input of the second discharge branch to the high-voltage bus and can disconnect it. A second output of the second discharge branch is connected to the output interface or is formed by the latter.

A second discharge switching device and a second discharge resistor are arranged in series with one another in the second discharge branch. The second discharge resistor is preferably arranged in series between the main switching device and the second discharge switching device.

The first discharge branch and the second discharge branch are electrically arranged in parallel with one another between the main switching device and the output interface. The first discharge branch and the second discharge branch are preferably different in terms of the electrical properties.

Within the scope of the invention, it is proposed that the discharge apparatus has a control device, wherein the control device is designed, in terms of programming and/or circuitry, to connect the first discharge branch and to interrupt the second discharge branch in a first discharge state as the operating state of the discharge apparatus and to connect the second discharge branch and to interrupt the first discharge branch in a second discharge state. Optionally, the discharge apparatus can assume a neutral state as an operating state, wherein the control device controls the discharge apparatus such that it disconnects the high-voltage bus and the basic bus from one another. This is achieved by virtue of the fact that the main switching device is open and/or both discharge switching devices are open.

In this case, the invention considers the fact that both discharge branches can be activated by means of the main switching device, but the respectively desired discharge branch can be selected by means of the discharge switching devices. The discharge branches themselves are matched to the respective discharge states, in particular in terms of circuitry. As a result of this structure, the main switching device can be used for both discharge branches, with the result that, in addition to the functional advantages that result from providing two discharge branches, the advantage of being able to save on components arises.

One preferred configuration of the invention provides for the impedance and/or the resistance of the first discharge resistor to be less than the impedance and/or the resistance of the second discharge resistor. This means that the discharge can be carried out more quickly in the first discharge branch than in the second discharge branch.

In one preferred development of the invention, the first discharge switching device is designed for higher powers than the second discharge switching device. This development also supports the implementation in which the discharge can be carried out more quickly in the first discharge branch than in the second discharge branch.

It is preferred for the main switching device and the first discharge switching device to be closed, in particular closed without interruption, in the first discharge state, so that the discharge can be carried out as quickly as possible. Alternatively or additionally, the first discharge state is in the form of a "load dump" discharge state. The "load dump" discharge state is activated, in particular, when the electrical drive arrangement operates in a recuperation mode and the energy storage device is electrically disconnected. In this recuperation mode, the load shedding caused by disconnecting the energy storage device may result in a voltage peak in the high-voltage bus, which must be discharged in order to avoid damage to other electrical and/or electronic components. As a result of the "load dump" discharge state, the high-voltage bus is pulled to earth via the first discharge resistor and/or is connected to the basic bus in a conductive manner, with the result that the voltage peak and/or the high voltage in the high-voltage bus is/are discharged in a controlled manner in a short time.

Alternatively or additionally, it is preferred for the main switching device and/or the second discharge switching device to be opened at least temporarily and/or to be keyed in the second discharge state. At least one of the switching devices is particularly preferably modulated using PWM ("pulse width modulation"). The other switching device may be continuously closed or may likewise be closed in a keyed manner, in sync with the above-mentioned switching device, and/or modulated using PWM ("pulse width modulation"). Alternatively or additionally, the second discharge state is in the form of an "active discharge" state in order to discharge an intermediate circuit of an inverter in the electrical drive arrangement. The high-voltage bus is particularly preferably discharged more quickly or with a higher power by virtue of the first discharge state than by virtue of the second discharge state.

In a normal discharge state as a second discharge state, the main switching device is particularly preferably closed in a keyed manner, in particular pulse-width-modulated (modulated using PWM), and the second discharge switching device is continuously closed. Additionally or alternatively, in an emergency discharge state as a second discharge state, the main switching device is continuously closed and the second discharge device is closed in a keyed manner, in particular pulse-width-modulated (modulated using PWM).

In the case of PWM ("pulse width modulation"), the respective switching device is closed in a "duty cycle" during a period duration and is otherwise open in the period duration, with the result that this switching device is closed in a keyed manner. The duty factor is, in particular, less than 1 or less than 100%, with the result that the "duty cycle" is shorter than the period duration.

It is preferred for the control device to be designed, in terms of programming and/or circuitry, such that a constant power, in particular an averaged constant power, is discharged via the second discharge branch and/or in the second discharge state. This is implemented by the control device by changing the duty factor as an actuator. However, it can be assumed that, during a process of the second discharge state, the duty factor must be adapted in order to achieve the constant power. This is due to the fact that energy is stored in the discharge apparatus, in particular in the first and/or second discharge resistor. Another reason is the thermal heating of the discharge apparatus, in particular of the discharge resistor, as a result of which the system behaviour changes. The control device particularly preferably has a model module, wherein the system behaviour, in particular the temperature-dependent system behaviour, is modelled in the model module. As an input variable, the model module receives, in particular, the temperature of the discharge apparatus, in particular of the first and/or second discharge resistor, and the duty factor needed to achieve the target variable as a constant power is output as an output variable.

In one preferred implementation in terms of circuitry, the main switching device and/or the first discharge switching device is/are in the form of an IGBT ("insulated-gate bipolar transistor", IGBT for short). In this configuration, high powers can be routed via the switching devices. Alternatively or additionally, the second discharge switching device is in the form of a MOSFET ("metal-oxide-semiconductor field-effect transistor", MOSFET or MOS-FET for short). This is sufficient since a lower power is routed via the discharge apparatus in the second discharge state than in the first discharge stayed as a result of the keying.

In one preferred development of the invention, the discharge apparatus, in particular the control device, has a first monitoring module. The monitoring module can be designed in terms of programming and/or circuitry. The first monitoring module is designed to check the functionality of the first discharge switching device. The control device is preferably designed to activate the first monitoring module for checking after the first discharge branch has been connected. In other words, the connection of the first discharge branch signifies a high load for the first discharge switching device. It is therefore advantageous to control such a check by the first monitoring module each time the first discharge branch has been connected.

If the check reveals that the first discharge switching device is faulty, the discharge apparatus is completely switched off. In particular, neither the first nor the second discharge state is assumed. The background of this is that the first discharge resistor is highly charged even when connecting the second discharge branch and/or in the second discharge state.

The discharge apparatus, in particular the control device, optionally has a second monitoring module. The second monitoring module is designed to carry out a check on the basis of the voltage in the high-voltage bus or an equivalent variable. An equivalent variable may be formed, for example, using a current measurement in the second discharge branch and a back-calculation to the voltage in the high-voltage bus. The second monitoring module is designed to check whether the voltage in the high-voltage bus falls in the second discharge state. This is the normal system behaviour in the second discharge state. If, for example in the event of faulty disconnection of the battery in the vehicle from the high-voltage bus, the voltage in the high-voltage bus remains constant, the second monitoring module is designed, in terms of programming and/or circuitry, to actuate the control device. As a result of the actuation, the control device changes the keying, in particular the duty factor, of the main switching device and/or of the second discharge switching device, with the result that a reduced, in particular constant, power is discharged via the second discharge branch in the second discharge state. For example, the power is halved. The background of this embodiment is that the discharge apparatus is thermally loaded in the second discharge state, wherein, in the event of the described fault, the high-voltage bus cannot be discharged in the planned time frame of the second discharge state. In order to avoid overheating of the discharge apparatus, the power, in particular the constant power, is reduced, with the result that the second discharge state can be carried out with a reduced, in particular constant, power over a longer time frame.

The invention also relates to an electrical drive arrangement for a vehicle having a discharge apparatus according to one of the preceding configurations. The electrical drive arrangement preferably comprises the energy storage device described above and the inverter described above. The high-voltage bus is connectable and/or connected, in particular, to the energy storage device and/or to the inverter. The connection is effected on the basis of the operating state of the electrical drive arrangement.

Further areas of applicability will become apparent from the description provided herein. The description and specific examples in this summary are intended for purposes of illustration only and are not intended to limit the scope of the present disclosure.

Further features, advantages and effects of the invention emerge from the following description of preferred exemplary embodiments of the invention. In the figures:

DRAWINGS

The drawings described herein are for illustrative purposes only of selected embodiments and not all possible implementations and are not intended to limit the scope of the present disclosure.

FIG. 1 shows a schematic block diagram of an electrical drive arrangement of a vehicle as an exemplary embodiment of the invention.

FIG. 1 shows a schematic block diagram of an electrical drive arrangement 1 of a vehicle as an exemplary embodiment of the invention. The vehicle is, in particular, in the form of a passenger car or another mobile device for road traffic. The vehicle may be in the form of a hybrid vehicle or a pure electric vehicle.

The drive arrangement 1 has at least one energy storage device 2 and an inverter 3 for supplying energy to an electric motor 4. The electric motor 4 is in the form of a traction motor for the vehicle. The electrical drive arrangement 1 also has a high-voltage bus 5 and a basic bus 6. The high-voltage bus 5 is connected to a positive connection of the energy storage device 2 via a switching device 7. The basic bus 6 is disconnectably or permanently connected to a negative connection of the energy storage device 2. The energy storage device 2 is in the form of a battery, for example, and is used to supply the electric motor 4. The inverter 3 is electrically connected to the high-voltage bus 5 (and to the basic bus 6) and converts the DC voltage from the energy storage device 2, via an intermediate circuit, into an AC voltage for the electric motor 4. An electrical connection from the electric motor 4 to the high-voltage bus 5 is indicated only schematically, wherein the electrical connection possibly leads via a plurality of electrical components and is used such that electrical energy can be returned to the energy storage device 2 in a recuperation mode, wherein the electric motor 4 operates as a generator. In a driving mode, energy is therefore guided from the energy storage device 2, via the high-voltage bus 5, to the inverter 3 and then to the electric motor 4. In the recuperation mode, energy is guided from the electric motor 4, possibly via a plurality of electrical components, to the energy storage device 2 via the high-voltage bus 5. The basic bus 6 is electrically connected in a corresponding manner.

In addition to the above-mentioned states of the electrical drive arrangement 1, two special states shall also be considered below:

"Load Dump":

A "load dump" arises when there is sudden load shedding in the electrical drive arrangement 1. This may produce voltage peaks in the high-voltage bus 5 which may damage electrical and/or electronic components. A possible scenario is, for example, when the electrical drive arrangement 1 operates in the recuperation mode and the energy storage device 2 is disconnected from the high-voltage bus 5, for example via the switching device 7. In this situation, the voltage peaks must be discharged very quickly.

"Active Discharge":

An "active discharge" is needed to discharge the voltage from the inverter 3, in particular from its intermediate circuit. A possible scenario is, for example, when, although the electric motor 4 is activated via an "ignition key" or a man-machine interface, it is immediately deactivated again. In this case, the corresponding voltage must be reduced in the high-voltage bus 5 and/or in the inverter 3 without delay, that is to say in a period of shorter than five seconds, in particular shorter than two seconds.

In order to implement these functions, the electrical drive arrangement 1 has a discharge apparatus 8. The discharge apparatus 8 is electrically connected to the high-voltage bus 5 via an input interface 9 and is electrically connected to the basic bus 6 by way of an output interface 10 which is formed via a plurality of contacts. In particular, the discharge apparatus 8 bridges the high-voltage bus 5 with the basic bus 6.

The discharge apparatus 8 has a main switching device 11, wherein the main switching device 11 is electrically connected to the high-voltage bus 5 as a first switching partner, in particular without the interposition of further elements. The main switching device 11 is in the form of an IGBT, in particular a normally closed n-channel IGBT, wherein the input interface 9 is connected to the collector. For example, the main switching device 11 is implemented as a component with the identification FGB40T65SPD-F085.

The discharge apparatus 8 has a first discharge branch 12a and a second discharge branch 12b. The first discharge branch 12a has a first input 13a and the second discharge branch 12b has a second input 13b. The first and second inputs 13a, b are electrically connected to the main switching device 11 as a second switching partner, in particular without the interposition of further elements. In particular, they make contact with an emitter of the switching device 7.

The first discharge branch 12a has a first discharge resistor 14a and a first discharge switching device 15a. The first discharge resistor 14a and the first discharge switching device 15a are connected in series. In particular, the first discharge switching device 15a is connected in series with and/or electrically to the first input 13a as a switching partner via the first discharge resistor 14a.

The first discharge switching device 15a is in the form of an IGBT, in particular a normally closed n-channel IGBT, wherein the first discharge resistor 14a is connected to the collector. For example, the first discharge switching device 15a is implemented as a component with the identification FGB40T65SPD-F085.

The first discharge switching device 15a is also connected to the output interface 10 and therefore to the basic bus 6 as a second switching partner. In particular, the output interface 10 is electrically connected to the emitter.

The second discharge branch 12b has a second discharge resistor 14b and a second discharge switching device 15b. The second discharge resistor 14b and the second discharge switching device 15b are connected in series. In particular, the second discharge switching device 15b is connected in series with and/or electrically to the second input 13b as a switching partner via the second discharge resistor 14b.

The second discharge switching device 15b is in the form of a MOSFET, in particular a high-voltage MOSFET. For example, the second discharge switching device 15b is implemented as a component with the identification FGB20N60SFD-F085. The second discharge switching device 15b is also connected to the output interface 10 and therefore to the basic bus 6 as a second switching partner.

Provision is made for the second discharge resistor 14b as "moderate impedance resistance" to be greater than the first discharge resistor as "low impedance resistance", with the result that the discharge current and/or the discharge power in the first discharge branch 10a is/are greater for the same voltage on the high-voltage bus 5. For this purpose, the first discharge resistor must allow higher powers during pulsed discharge, for example more than 80 kW.

The discharge apparatus 8 also has a control device 16 which can be implemented in hardware or software and/or in terms of programming and/or circuitry. The control device 16 is designed to control the switching devices 11, 15a, b. The control is illustrated in a highly diagrammatic manner and is respectively implemented in this exemplary embodiment by controlling the gates. The main switching device 11 and/or the second discharge switching device 15b may be controlled in a keyed manner by the control device 16. In particular, they are controlled using pulse width modulation as the keying.

The discharge apparatus 8 may assume a first discharge state and a second discharge state:

In the first discharge state, the main switching device 11 and the first discharge switching device 15a are switched to be continuously closed by the control device 16. In the first discharge state, the voltage in the high-voltage bus 5 is discharged at a very high, in particular maximum, speed. The discharge process is intended to be, in particular, shorter than 0.5 seconds, in particular shorter than 0.1 seconds. The discharge current is more than 100 A, preferably more than 150 A. The first discharge state is assumed if a "load dump" has been carried out and the voltage and/or energy must be quickly discharged from the high-voltage bus 5. The first discharge state is activated, for example, if a corresponding voltage peak has been detected in the high-voltage bus 5.

In the second discharge state, the second discharge switching device 15b is switched to be continuously closed in a normal discharge state as the second discharge state. In contrast, the main switching device 11 is keyed, wherein the control device 16 is designed to set the duty factor such that a constant power flows away via the second discharge branch 12b. The pulse widths ("duty cycle") in pulse width modulation are set in a range between 200 μs and 10 ms, for example. This is advantageous in order to achieve effective and/or efficient discharge. The second discharge state is assumed if an "active discharge" is intended to be implemented.

If it is detected that the main switching device 11 is in a short-circuit state, an emergency discharge state can be implemented as the second discharge state, wherein, as a result of the short-circuit state, the main switching device 11 is continuously closed and the second discharge switching device 15b is keyed in order to keep the discharge power constant. A typical discharge power in the second discharge state is 30 W, for example.

In both discharge states, the respective discharge resistor 14a can be effected by opening the main switching device, the respective discharge switching device 15a, b or by both.

In the electric motor 4 in the form of an asynchronous machine, opening of the switching device 7 in the form of a battery switch in the vehicle in the recuperation mode may result in an overvoltage at the IGBTs (intermediate circuit voltage), which can result in destruction of the IGBTs. This event is also called a "load dump". The present discharge apparatus 8 with the "load dump" circuit, which runs via the first discharge branch 12a, limits the overvoltage using semiconductors and resistors. The "load dump" circuit has a second function by virtue of it also being largely used for the "active discharge" function in the inverter 3 via the second discharge branch 12b. The "active discharge" function uses a pulse-width-modulated signal in order to discharge the intermediate circuit of the inverter 3 to <60 V within 1.5 s at a constant power. An intelligent discharging method makes it possible to minimize the energy which arises and thereby to avoid complicated cooling of the discharge circuit, which is an important cost advantage.

The advantage of the discharge apparatus 8 is that a circuit for "load dump" and "active discharge" has been developed with little effort, which circuit meets all of the requirements for the power electronics and for functional safety and additionally entails a cost advantage. The circuit is preferably a digital solution with respect to the control device 16—as a result, it has a high reuse possibility since the circuit becomes easily usable for further projects by means of re-parameterization.

The discharge apparatus 8 and/or the electrical drive arrangement 1 and/or the control device 16 may have a first monitoring module 17a which is designed to check the functionality of the first discharge switching device 15a. For example, provision may be made in monitoring logic for such a check to be carried out each time the first discharge branch 12a has been activated. As further safety measures, it is possible to control the control voltage and/or "drain" voltage of the first discharge switching device 15a, for example. Provision may also be made for the current flow through the second discharge switching device 15b to be monitored. This current forms an equivalent variable to the voltage in the high-voltage bus. The corresponding measured value is supplied to a second monitoring module 17b which monitors whether the voltage in the high-voltage bus 5 falls in the second discharge state. If the voltage in the high-voltage bus 5 does not fall, the control device 16 can be actuated to change the keying such that the value of the constant power which is discharged via the second discharge branch 12b is reduced, for example halved.

LIST OF REFERENCE DESIGNATIONS

1 Electrical drive arrangement
2 Energy storage device
3 Inverter
4 Electric motor
5 High-voltage bus
6 Basic bus
7 Switching device
8 Discharge apparatus
9 Input interface
10 Output interface
11 Main switching device
12a First discharge branch
12b Second discharge branch
13a First input
13b Second input
14a First discharge resistor
14b Second discharge resistor
15a First discharge switching device
15b Second discharge switching device
16 Control device
17a, b First and second monitoring module

What is claimed is:

1. A discharge apparatus for an electrical drive arrangement of a vehicle, wherein the drive arrangement has a high-voltage bus and a basic bus, wherein the high-voltage bus is connectable to an energy storage device, an inverter, and an electrical machine, the discharge apparatus comprising:
an input interface, wherein the input interface is connectable to the high-voltage bus of the drive arrangement,
an output interface, wherein the output interface is connectable to the basic bus,
a main switching device, wherein the main switching device is connected to the input interface;
a first discharge branch defining a first input connected to the main switching device, and defining a first output connected to the output interface, wherein the first discharge branch has a first discharge switching device, wherein the first discharge switching device selectively conducts current between the first input and the first output, wherein the first discharge branch has a first discharge resistor, wherein the first discharge resistor is arranged in terms of circuitry between the first input and the first output;
a second discharge branch defining a second input connected to the main switching device, and defining a second output connected to the output interface, wherein the second discharge branch has a second discharge switching device, wherein the second discharge switching device selectively conducts current between the second input and the second output, wherein the second discharge branch has a second discharge resistor, wherein the second discharge resistor is arranged in terms of circuitry between the second input and the second output;
wherein the main switching device is configured to selectively conduct current between the inverter and each of the first input of the first discharge branch and the second input of the second discharge branch;
a control device, wherein the control device is configured to drive the first discharge switching device to a conductive state in a first discharge state of the discharge apparatus and to drive the second discharge switching device to a conductive state in a second discharge state.

2. The discharge apparatus according to claim 1, wherein the impedance and/or the resistance of the first discharge resistor is/are less than the impedance and/or the resistance of the second discharge resistor.

3. The discharge apparatus according to claim 1, wherein the main switching device and the first discharge switching device are closed in the first discharge state, and/or in that the first discharge state is in the form of a "load dump" discharge state.

4. The discharge apparatus according to claim 1, wherein the control device is designed to control a normal discharge state as the second discharge state, wherein the main switching device is closed at least temporarily and/or in a keyed manner and the second discharge switching device is closed, and to control an emergency discharge state as the second discharge state, wherein the main switching device is closed and the second discharge switching device is closed at least temporarily and/or in a keyed manner.

5. The discharge apparatus according to claim 1, wherein the main switching device and/or the first discharge switching device is/are in the form of an IGBT (insulated-gate bipolar transistor).

6. The discharge apparatus according to claim 1, wherein the second discharge switching device is in the form of a MOSFET (metal-oxide-semiconductor field-effect transistor).

7. The discharge apparatus according to claim 1, wherein the main switching device and/or the second discharge switching device is/are closed at least temporarily and/or in a keyed manner in the second discharge state and the respective other switching device is either continuously closed or is likewise closed at least temporarily and/or in a keyed manner and/or the second discharge state is in the form of an "active discharge" discharge state.

8. The discharge apparatus according to claim 7, wherein the control device is designed to key the main switching device and/or the second discharge switching device in such a manner that a constant power is discharged via the second discharge branch in the second discharge state.

9. The discharge apparatus according to claim 1, further including a first monitoring module, wherein the first monitoring module is designed to check the functionality of the first discharge switching device, wherein the control device is designed to activate the first monitoring module for checking after the first discharge branch has been connected.

10. The discharge apparatus according to claim 9, further including a second monitoring module, wherein the second monitoring module is designed to check, on the basis of the voltage in the high-voltage bus or an equivalent variable, whether the voltage in the high-voltage bus falls in the second discharge state and, if this remains constant, to actuate the control device to cause the main switching device and/or the second discharge switching device to be keyed in such a manner that a reduced, in particular constant, power is discharged via the second discharge branch in the second discharge state.

11. An electrical drive arrangement for a vehicle, comprising:
- a high-voltage bus and a basic bus;
- an energy storage device, an electric machine and an inverter connected to the high voltage bus;
- an input interface connected to the high-voltage bus;
- an output interface connected to the basic bus;
- a main switching device connected to the input interface;
- a first discharge branch having a first input connected to the main switching device and a first output connected to the output interface;
- the first discharge branch having a first discharge switching device arranged between the first input and the first output, wherein the first discharge branch selectively conducts current between the first input and the first output, wherein the first discharge branch has a first discharge resistor between the first input and the first output;
- a second discharge branch in parallel with the first discharge branch, and having a second input connected to the main switching device and a second output connected to the output interface;
- the second discharge branch having a second discharge switching device arranged between the second input and the second output, wherein the second discharge branch selectively conducts current between the second input and the second output, wherein the second discharge branch has a second discharge resistor between the second input and the second output;
- wherein the main switching device is configured to selectively conduct current between the inverter and each of the first input of the first discharge branch and the second input of the second discharge branch;
- a control device configured to drive the first discharge switching device to a conductive state in a first discharge state of the discharge apparatus and to drive the second discharge switching device to a conductive state in a second discharge state.

* * * * *